(12) United States Patent
Cerra (10) Patent No.: US 6,597,301 B2
(45) Date of Patent: Jul. 22, 2003

(54) APPARATUS AND METHOD FOR LEVEL-DEPENDENT COMPANDING FOR WIRELESS AUDIO NOISE REDUCTION

(75) Inventor: David Cerra, Naperville, IL (US)

(73) Assignee: Shure Incorporated, Evanston, IL (US)

( * ) Notice: Subject to any disclaimer, the term of this patent is extended or adjusted under 35 U.S.C. 154(b) by 0 days.

(21) Appl. No.: 09/970,400

(22) Filed: Oct. 3, 2001

(65) Prior Publication Data
US 2003/0063024 A1 Apr. 3, 2003

(51) Int. Cl.[7] ................................................ H03M 1/12
(52) U.S. Cl. ........................................ 341/155; 333/14
(58) Field of Search .......................... 341/155, 50, 51, 341/167; 455/43; 333/14; 380/38

(56) References Cited

U.S. PATENT DOCUMENTS

| | | | |
|---|---|---|---|
| 4,168,472 A | | 9/1979 | Sugimoto |
| 4,215,431 A | * | 7/1980 | Nady ........................... 333/14 |
| 4,224,581 A | | 9/1980 | Watanabe et al. |
| 4,376,916 A | | 3/1983 | Glaberson |
| 4,412,189 A | | 10/1983 | Kominami et al. |
| 4,473,852 A | | 9/1984 | Kominami et al. |
| 4,476,502 A | | 10/1984 | Watanabe et al. |
| 5,136,290 A | * | 8/1992 | Bond et al. ................... 341/106 |
| 5,168,522 A | * | 12/1992 | Simanis et al. ............... 380/38 |
| 5,444,788 A | | 8/1995 | Orban |
| 5,703,581 A | * | 12/1997 | Matias et al. ................. 341/67 |
| 5,926,334 A | | 7/1999 | Suzuki |
| 6,038,430 A | * | 3/2000 | Thomson et al. ............. 455/43 |

FOREIGN PATENT DOCUMENTS

| | | |
|---|---|---|
| DE | 31 27 595 A | 1/1983 |
| DE | 100 11 193 A | 9/2001 |
| EP | 0 855 807 * | 7/1998 |

OTHER PUBLICATIONS

THAT 4311 Applications Note, www.thatcorp.com. (No date).
THAT 2252 Applications Note, www.thatcorp.com. (No date).
THAT 2181A Applications Note, www.thatcorp.com. (No date).
"The Mathematics of Log–based Dynamic Processors," www.thatcorp.com/datashts/an101a.pdf, retrieved Dec. 24, 2002.
Floru, Fred, "Attack and Release Time Constants in RMS-–Based Feedback Compressors," Journal of Audio Engineering Society, vol. 47, No. 10, Oct. 1999, pp. 788–804.

* cited by examiner

Primary Examiner—Jean Bruner Jeanglaude
(74) Attorney, Agent, or Firm—Banner & Witcoff, Ltd.

(57) ABSTRACT

Apparatus and method that mitigate the noise incurred on a wireless communications path between an encoder and a decoder of a wireless audio noise reduction system that utilizes frequency modulation (FM). The encoder includes a variable compressor that invokes compression whenever the input signal is above a first threshold level. The decoder includes a variable expander that invokes expansion whenever the received signal from the decoder is above a second threshold.

45 Claims, 6 Drawing Sheets

APPARATUS AND METHOD FOR LEVEL-DEPENDENT COMPANDING FOR WIRELESS AUDIO NOISE REDUCTION

FIELD OF THE INVENTION

The invention relates to wireless audio microphone systems.

BACKGROUND OF THE INVENTION

In order to provide audio communication between a talker and those listening to the talker, audio electronic equipment is often utilized to facilitate the communication. The term "talker" can connote a variety of input sources, including a person articulating language or a musical band playing a song. Moreover, the talker may require an untethered connection to the audio electronic equipment for greater mobility. A wireless connection between the acoustical speaker and the electronics equipment can be provided by frequency (FM) radio techniques in which the audio electronics equipment comprises a transmitter (which includes an encoder) and a receiver (which includes a decoder). In such an arrangement, the transmitter processes the audio signal as provided by the talker and modulates the signal so that the transformed signal can be conveyed over the wireless path to a receiver. The receiver demodulates the received signal, and the processed received signal is then presented to circuitry that may amplify the processed received signal. The corresponding signal may be recorded by additional recording circuitry or may be converted into an audio signal with an acoustical speaker arrangement.

The quality of the processed received signal, and consequently the associated audio signal, can be degraded by any "noise" that is generated in the wireless path between the encoder and the decoder. (The term "noise" is associated with a randomly varying signal superimposed on the desired, undistorted signal). There are a number of sources of noise with respect to the wireless path, including transmitter VCO (voltage controlled oscillator) phase noise, transmitter synthesizer stability, the quality of the FM detector in the receiver, receiver RF band pass filtering, and the receiver's local oscillator. Moreover, with FM radio techniques the wireless path is susceptible to FM noise generated when a weak radio signal as received by the receiver.

The FM noise results in the audio signal (as provided to the listener) having "breathing" characteristics because of the similar sound characteristics of someone breathing. The "breathing" effect is caused by the dynamic noise in conjunction with the type of companding. Moreover, the degree of the "breathing" effect increases with the dynamic noise level. The resulting effect can be noticeable to the listener and is perceived as a degradation of the audio signal. Thus, a solution that ameliorates the "breathing" effect is an advancement in wireless microphone technology.

BRIEF SUMMARY OF THE INVENTION

The present invention mitigates the "breathing effect" associated with a wireless communications path between an encoder and a decoder of a wireless audio noise reduction system. Otherwise, the listener perceives a sound that is characteristic of someone breathing. The "breathing" effect is caused by the dynamic noise in conjunction with the type of companding. Moreover, the degree of the "breathing" effect increases with dynamic noise level.

The present invention provides apparatus and method to mitigate the corresponding breathing effect. According to the present invention, the wireless audio noise reduction system comprises an encoder and a decoder. The encoder comprises a variable compressor that invokes compression whenever the input signal is above a first input threshold, a frequency modulation (FM) modulator, and a matching network that interfaces the modulator to a first antenna that transmits over the wireless communications path. The decoder receives a signal from the encoder over the wireless communications path through a second antenna. The decoder comprises a FM detector and a variable expander that invokes expanding operation above a second input threshold.

An exemplary embodiment of the present invention is presented illustrating an architecture of the encoder and decoder having a communications path such as a radio path or a cable. Moreover, an electrical design of the encoder and decoder is presented with commercially available components.

DETAILED DESCRIPTION OF THE INVENTION

Figure 1:
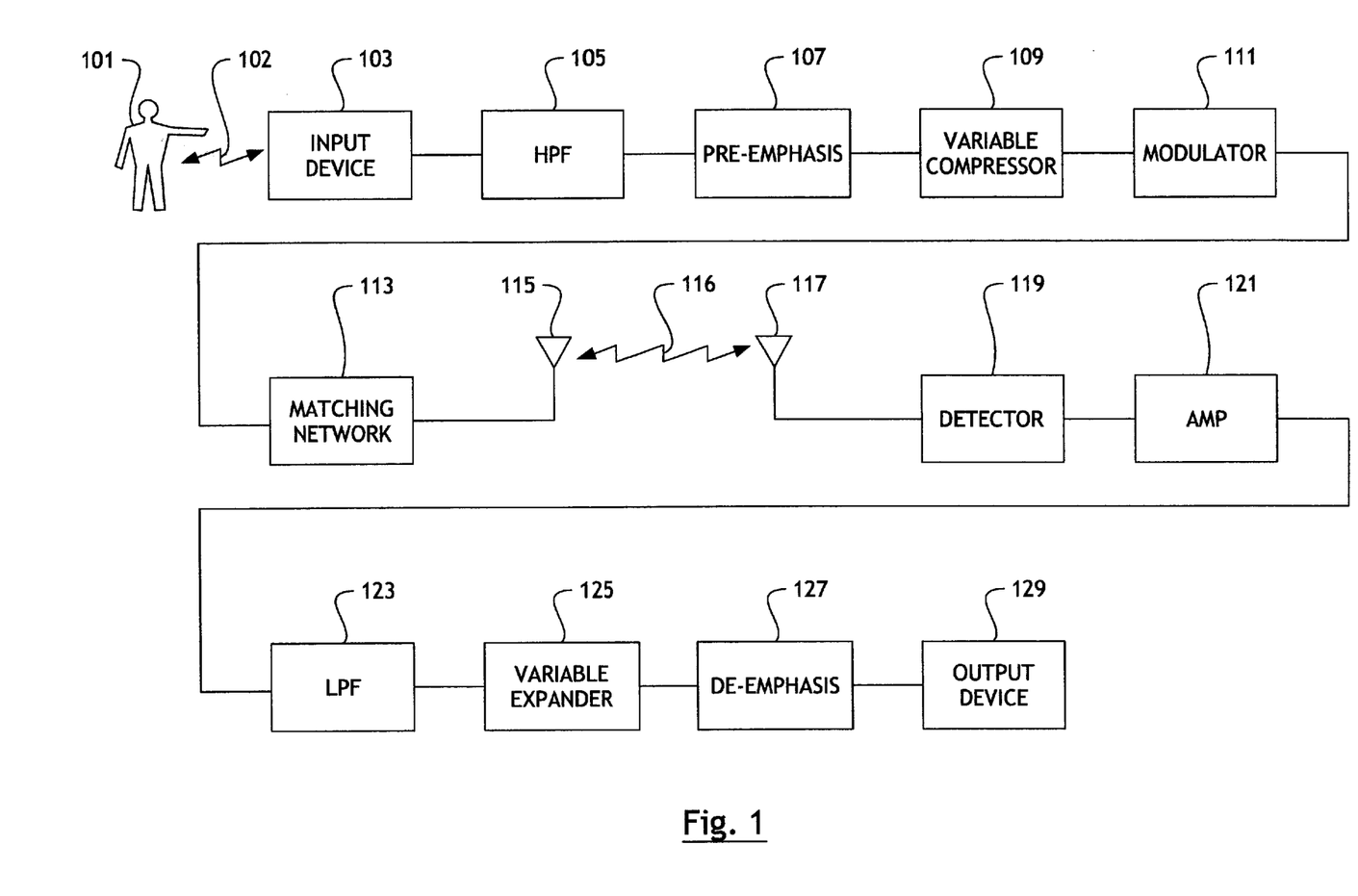
FIG. 1 shows a system architecture of a wireless audio noise reduction system in accordance with the present invention.

FIG. 1 shows a system architecture of wireless audio noise reduction system 100 in accordance with the present invention. Input source 101 generates an acoustical signal that is processed by input device 103 over transmission path 102. While FIG. 1 depicts input source 101 as being a person, one skilled in the art appreciates that input source 101 can a person, a musical instrument, a compact disc (CD), or any generator of a audio frequency band signal. Input device 103 processes the signal produced by input source 101. Consequently, the selection of input device 103 is dependent upon the selection of input source 101. For example, if input source 101 is a person, a microphone is applicable as input device 103. If input source 101 is a CD, then the electronics associated with a CD player is applicable as input device 103. Transmission path 102 is dependent upon the selection the selection of 101 and 103. Some examples of transmission path 102 include air or a cable connecting 101 and 103.

HPF 105 is a high pass filter that reduces unwanted noise (e.g. wind noise while talking in a car) that can be generated through transmission path 102. However, the need for including HPF 105 is dependent upon the characteristics of input source 101, transmission path 102, and input device 103. Pre-emphasis circuit 107 enhances the gain of the higher frequency component of the presented signal. It is well known in the art that the inclusion of a pre-emphasis circuit increases the resulting signal to noise ratio (S/N) with frequency modulation techniques. The resulting signal is the input signal to variable compressor 109.

Variable compressor 109 has a gain characteristic that is dependent upon the level of the input signal. The gain characteristic is discussed in relation to FIG. 2, while the operation of variable compressor 109 is discussed in more detail with FIG. 3. Variable compressor 109 invokes compression only if the input signal to 109 is above a first input threshold. If not (i.e. the input signal is below the first input threshold), variable compressor 109 has a fixed gain (typically between 35 and 50 dB). In other words, the compression characteristic of variable compressor 109 is disabled.

The output of variable compressor 109 is processed by modulator 111. Modulator 111 utilizes frequency modulation (FM) techniques. The resulting output of 111 is processed by matching network 113. Matching network 113 matches the impedance of the encoder to the impedance of antenna 115 and provides the desired signal level for transmission. Communications is established between antenna 115 and antenna 117 over radio frequency (RF) path 116. Alternative embodiments can utilize other types of transmission media other than a radio frequency medium. Alternative examples include an infrared transmission medium and a visible light medium.

The received signal that is received by antenna 117 of a decoder is processed by FM detector 119. FM detector 119 utilizes FM techniques to convert a FM signal into a baseband audio signal. Amplifier 121 amplifies the output signal of FM detector 119 to an appropriate level. Depending upon the characteristics of the received signal, amplifier 121 may not be required. The output from amplifier 121 is processed by LPF 123, which is a low pass filter. The response of LPF 123 in conjunction with the response of HPF 105 creates an effective band pass filter that reduces ultra-sonic and sub-sonic information that may impede the operation of variable expander 125. The output of LPF 123 is then processed by variable expander 125.

Variable expander 125 has an inverse gain characteristic of variable compressor 109 in order to recover the input signal from input source 101. Variable expander 125 invokes expanding operation if the input signal is above a second threshold level. Below the second threshold level, expander 125 has a fixed gain to compensate for the corresponding fixed gain of variable compressor 109. The operation of expander 125 is discussed in greater detail with FIG. 4.

The output of variable expander 125 is then processed to de-emphasis circuit 127. De-emphasis circuit has an essentially inverse gain function of pre-emphasis circuit 105. Thus, de-emphasis circuit 127 has a higher gain for the lower-frequency component of an input signal. The processed signal is presented to output device 129. Examples of output device 129 include a mixing console, an acoustical speaker, and a recording device.

Even though FIG. 1 shows a wireless system, the present invention is applicable to a non-wireless system in which RF path 116 is replaced with a non-wireless transmission path such as a cable, infrared transmission medium, or a visible light medium as can be appreciated by one skilled in the art. The degree of "breathing" is dependent upon the amount of signal degradation incurred with the non-wireless path. Moreover, as can be appreciated by one skilled in the art, the present invention is applicable to audio communications system utilizing modulation schemes other than frequency modulation.

Figure 2:
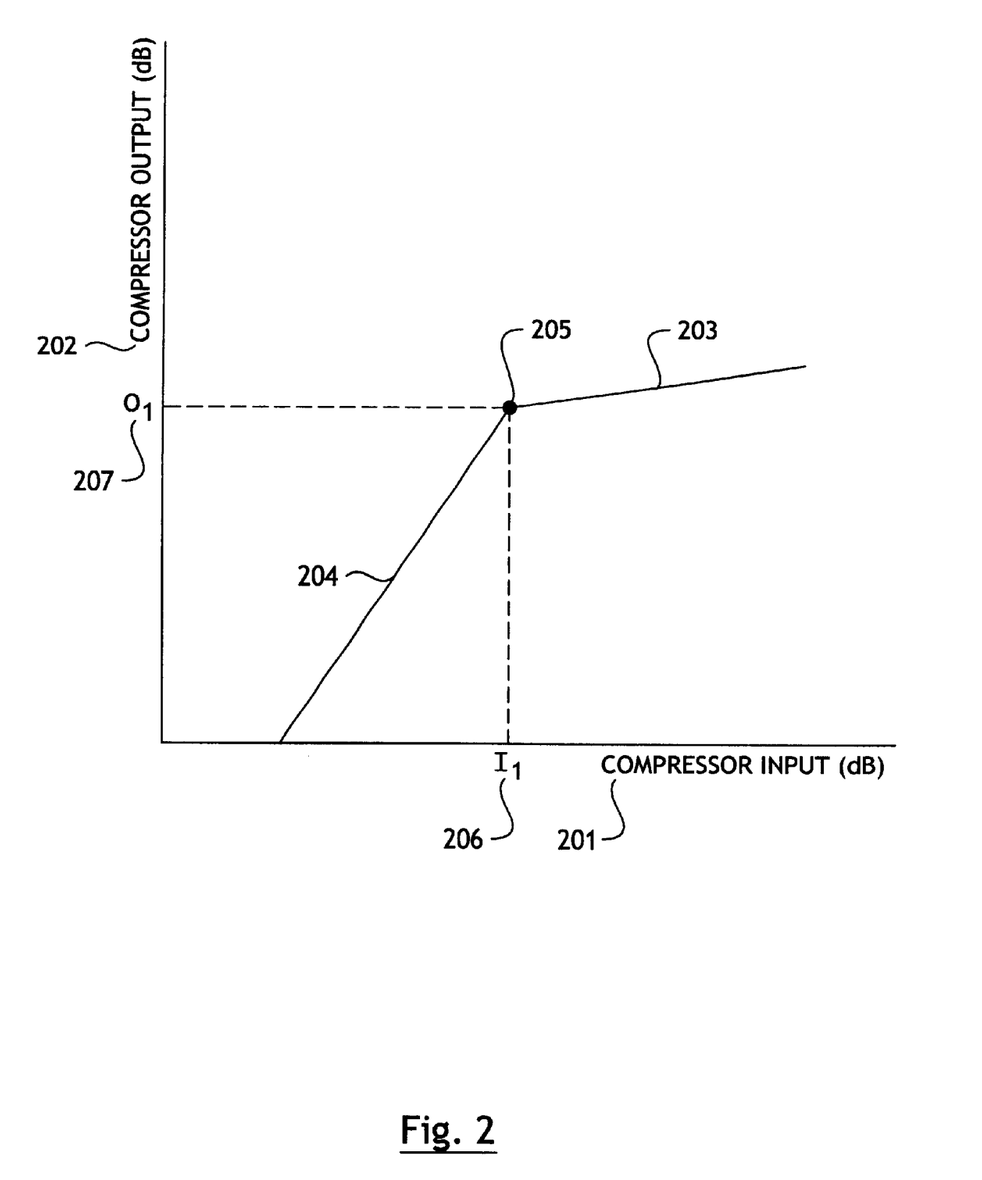
FIG. 2 shows a relationship of the gain function of a variable compressor.

FIG. 2 shows a relationship of the gain function of variable compressor 109 that is shown in FIG. 1. Compressor input 201 (in dB) is mapped to compressor output 202 (in dB). Whenever compressor input 201 is above I1 206, variable compressor 109 invokes compression operation as reflected by curve 203. Graphical point 205 corresponds to I1 206 in which the associated compressor output is O1 207. If compressor input 201 is below I1 206, then variable compressor 109 has a gain of essentially one as represented by curve 204.

In engineering the gain function of variable compressor 109, the designer must consider the voltage rails associated with 109. The associated voltage levels of the processed signal are restrained by the voltage levels of the power supply. Graphical point 205 is chosen in order to satisfy the restraints as imposed by the voltage rails and the dynamic range requirement of wireless audio noise reduction system 100. The gain function of variable expander 125 can be derived from FIG. 2 by replacing compressor input 201 with the expander output and by replacing compressor output 202 with the expander input. By increasing the compression ratio (as reflected in curve 203), the greater the value of compression input I1 206. The increased value of I1 206 is desirable because the "breathing" effect (that is induced by the noise generated on RF path 116) is mitigated. However, increasing the compression ratio requires that the expansion ratio increase accordingly. However, with increased compression and expansion ratios, the component tolerances of variable compressor 109 and variable expander 125 become more critical. If the compression and the expansion ratios become too large, the practicality of wireless audio noise reduction system 100 is compromised.

Figure 3:
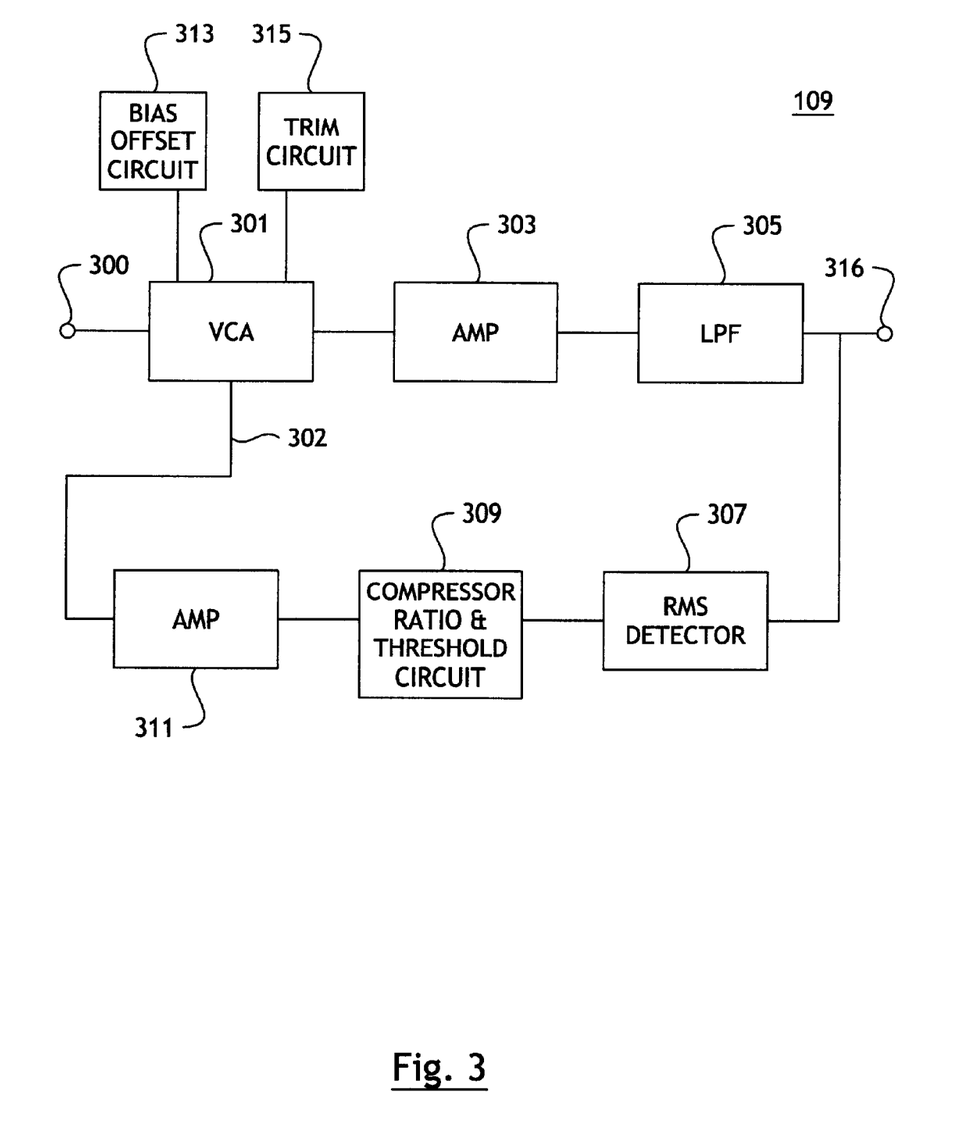
FIG. 3 shows a functional diagram of a variable compressor.

FIG. 3 shows a functional diagram of variable compressor 109. The input signal from pre-emphasis circuit 107 is connected to input 300 of VCA (voltage controlled amplifier) 301. VCA 301 is an amplifier whose gain varies with control voltage 302. The output of VCA 301 is processed by amplifier 303 and LPF 305. LPF 305 is a low pass filter and functions as an integrator to provide a desired time constant to mitigate undesired transients. LPF 305 is optional to the design in accordance with the required filtering characteristics of the encoder's feedback. Output 316 of variable compressor 109 is processed by modulator 111 as well as processed by a feedback loop circuit configuration comprising RMS detector 307, compressor ratio and threshold circuit 309, and amplifier 311. RMS detector 307 processes the output from LPF 305 so that the output of RMS detector 307 is representative of the root mean square (RMS) value of output 316. Circuit ratio and threshold circuit 309 processes the output of RMS detector 307 in order to invoke compressor operation above compressor input I1 206. Moreover, circuit 309 insures that the signal levels of VCA 301 and 307 are compatible. Bias offset circuit 313 is incorporated to insure that the bias level of VCA 301 is compatible with the bias level of RMS detector 307. Trim circuit 315 provides symmetry in the associated waveform in order to reduce distortion of the output of VCA 301.

Figure 4:
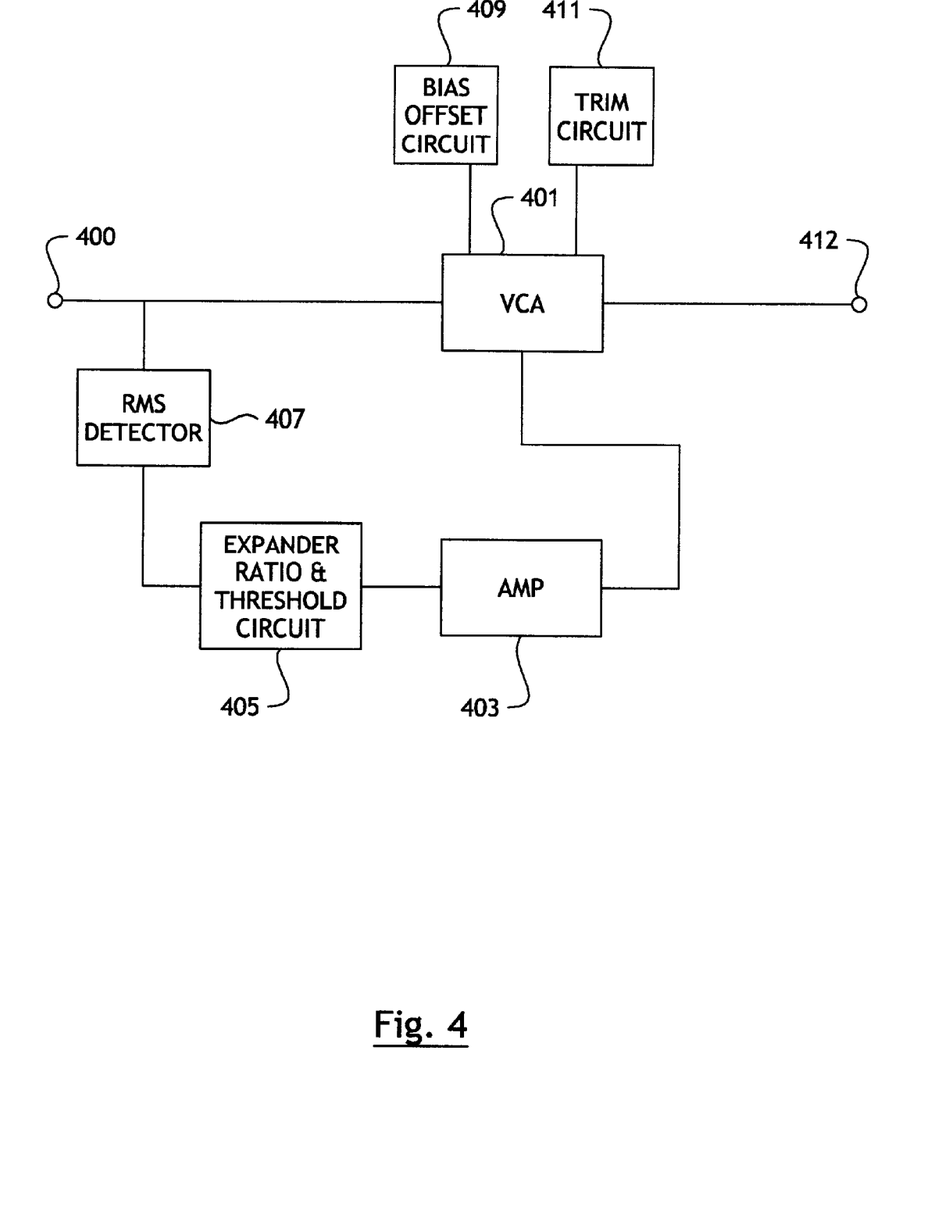
FIG. 4 shows a functional diagram of a variable expander.

FIG. 4 shows a functional diagram of variable expander 125 as shown in FIG. 1. Input 400 is connected to the output of LPF 123 in FIG. 1. Output 412 is connected to the input of de-emphasis circuit 127 in FIG. 1. The functionality of VCA 401, expansion ratio and threshold circuit 405, RMS detector 407, bias offset circuit 409, and trim circuit 411 correspond to the functionality of VCA 301, compressor ratio and threshold circuit 309, RMS detector 307, bias offset circuit 313, and trim circuit 315 respectively as shown in FIG. 3. The design of expansion ratio and threshold circuit 405 must account for the fact that gain function of VCA 401 is essentially the inverse function of the gain function of VCA 301.

Figure 5:
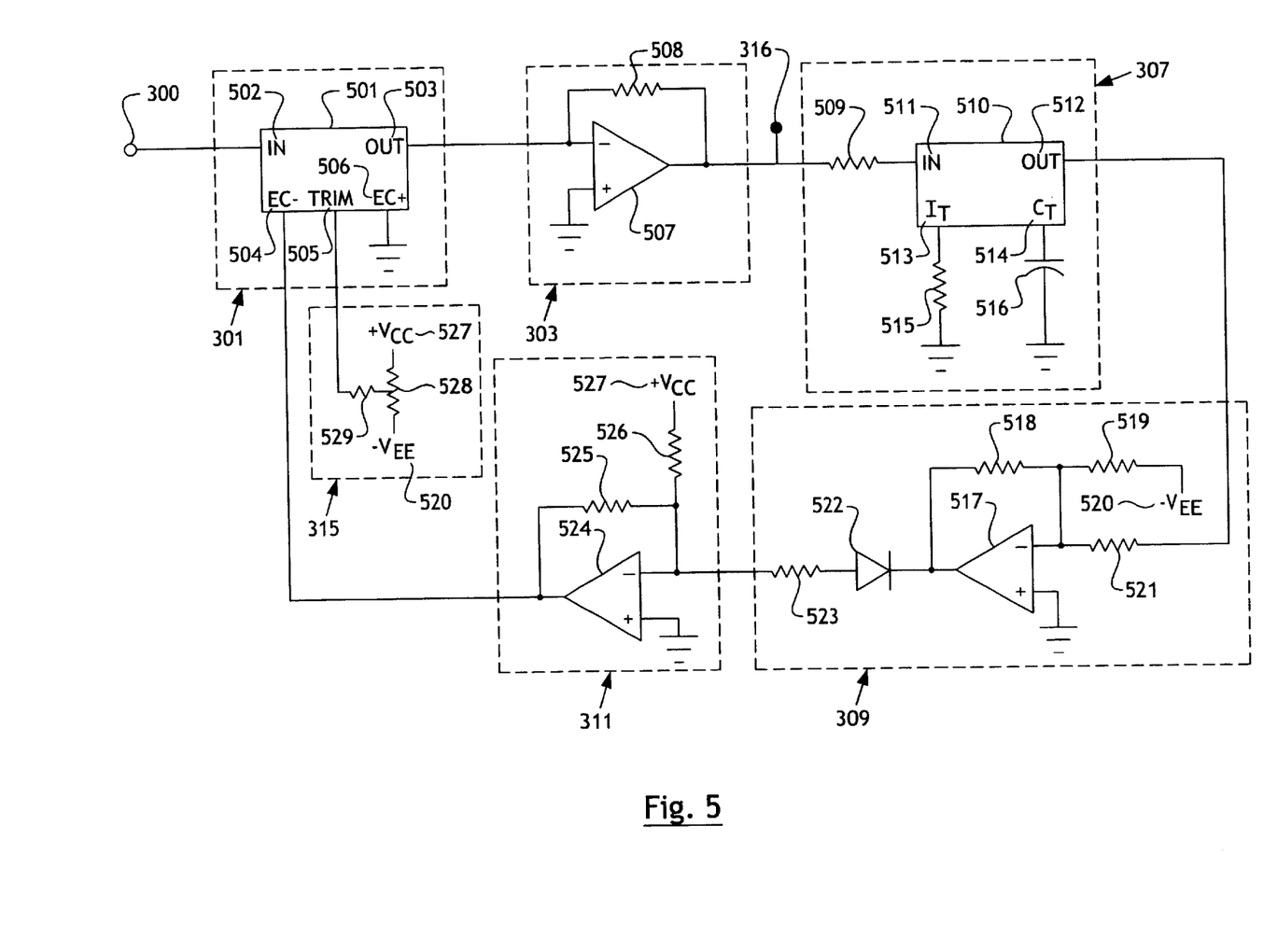
FIG. 5 shows an electrical schematic diagram for implementing a variable compressor in accordance with FIG. 3.

FIG. 5 shows an electrical schematic diagram for implementing variable compressor 109 in accordance with FIG. 3. In the illustrative implementation, integrated circuit 501 and integrated circuit 510 are THAT2181 and THAT2252, respectively. Both integrated circuits are manufactured by THAT Corporation. (Product specifications are available on the Internet at www.thatcorp.com.) Alternatively, THAT4311 RMS detector may be substituted for THAT2252 as integrated circuit 510. Input 300 is connected to pin 502 (in) and pin 503 (out) is connected to operational amplifier 507. Operational amplifier 507 and resistor 508 correspond to amplifier 303 in FIG. 3. Pin 504 (EC−) is connected to the feedback loop comprising amplifier 311, compressor ratio and threshold circuit 309, and RMS detector 307. Pin 505 (TRIM) is connected to 315. Pin 506 (EC+) is grounded.

The output of operational amplifier 507 corresponds to output 316, which is the output of variable compressor 109. Moreover, output 316 is processed by RMS detector 307, which comprises integrated circuit 510, resistor 509, resistor 515, and capacitor 516. Resistor 509 is connected to pin 511 (in) of integrated circuit 510. Resistor 515, which is connected to pin 513 ($I_T$), and capacitor 516, which is connected to pin 514 ($C_T$), allow for tuning the time constant of integrated circuit 510. Pin 512 (out) is connected to the input of compressor ratio and threshold circuit 309, which comprises resistors 518, 519, 521, and 523, operational amplifier 517, and diode 522. The compression threshold is determined by the corresponding DC offset as adjusted by resistors 518, resistor 519, and voltage source 520 ($-V_{EE}$). The compression ratio is determined by the gain of operational amplifier 517.

The output of compressor ratio and threshold circuit 309 is processed by amplifier 311, which comprises operational amplifier 524, resistor 525, and resistor 526. The output of amplifier 311 is connected to pin 504 (EC−) in order to control the voltage gain of integrated circuit 501.

The distortion of the output of integrated circuit 501 is reduced by adjusting the voltage level presented to pin 505 (TRIM) by trim circuit 315. Trim circuit 315 comprises resistor 528 and 529. The resistor configuration acts as a voltage divider that is coupled with voltage sources 520 ($-V_{EE}$) and 527 ($+V_{CC}$).

Figure 6:
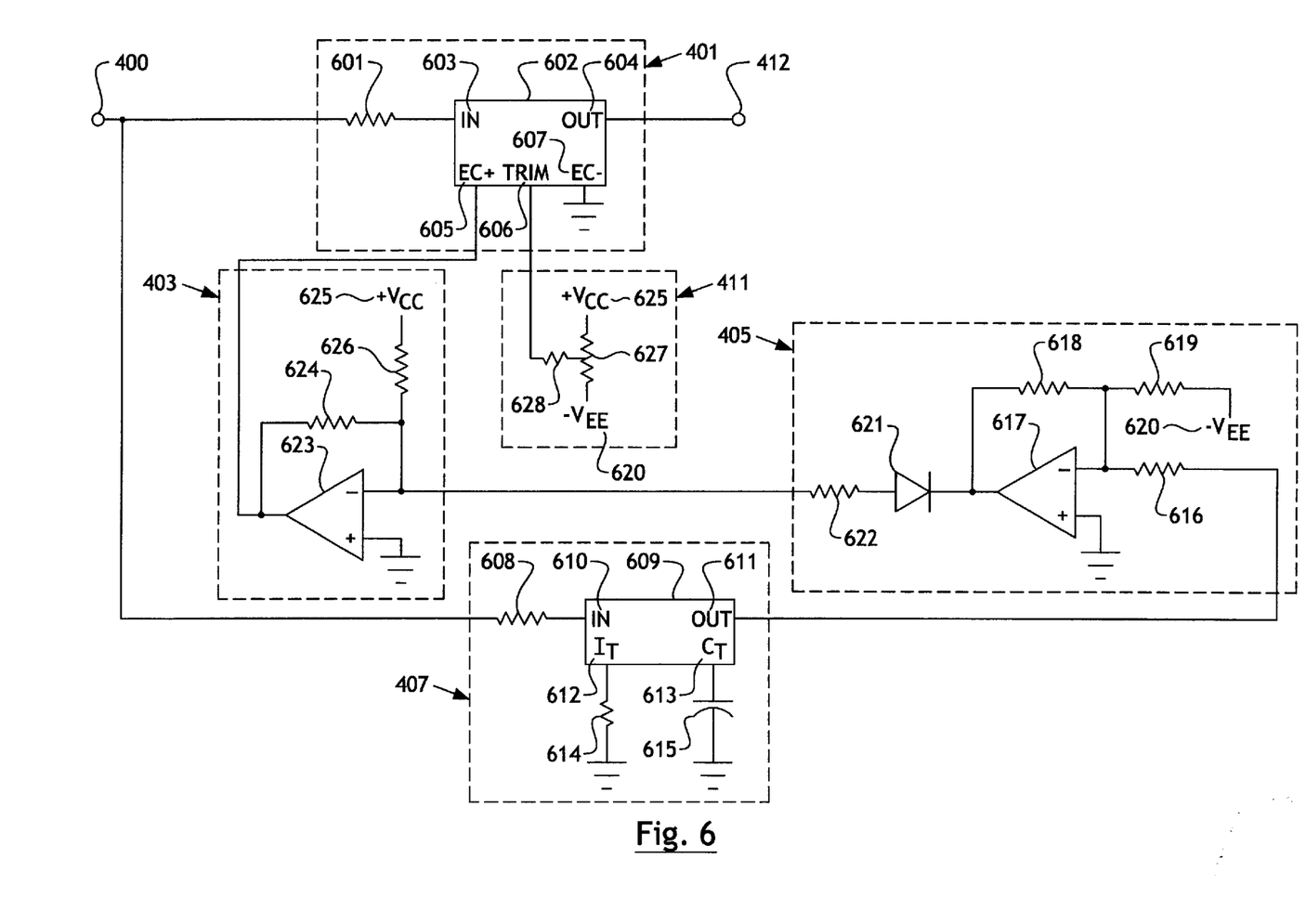
FIG. 6 shows an electrical schematic diagram for implementing a variable expander in accordance with FIG. 4.

FIG. 6 shows an electrical schematic diagram for implementing variable expander 125 in accordance with FIG. 4. In the illustrative implementation, integrated circuit 602 and integrated circuit 609 are THAT2181 and THAT2252, respectively. Alternatively, THAT4311 RMS detector may be substituted for THAT2252 as integrated circuit 609. Input 400 is connected to pin 603 (in) of integrated circuit 602 through resistor 601. Pin 604 (out) is connected to output 402 of variable expander 125.

A control loop, comprising RMS detector 407, expansion ratio and threshold circuit 405, and amplifier 403 is configured between input 400 and pin 605 (EC+) of integrated circuit 602. Pin 606 (TRIM) is connected to trim circuit 625, and pin 607 (EC−) is grounded.

RMS detector 407 comprises resistor 608, integrated circuit 609, resistor 614, and capacitor 615. Resistor 614, which is connected to pin 612 ($I_T$), and capacitor 615, which is connected to pin 613 ($C_T$) allows for tuning the time constant of integrated circuit 609. Pin 611 (out) is connected to the input of expansion ratio and threshold circuit 405, which comprises resistors 616, 618, 619, and 622, operational amplifier 617, and diode 521. The expander threshold is determined by the corresponding DC offset as adjusted by resistors 618, resistor 619, and voltage source 620 ($-V_{EE}$). The expansion ratio is determined by the gain of operational amplifier 620.

The output of expansion ratio and threshold circuit 405 is processed by amplifier 403, which comprises operational amplifier 623, resistor 624, and resistor 626 through voltage source 625 ($+V_{CC}$). The output of amplifier 403 is connected to pin 605 (EC+) in order to control the voltage gain of integrated circuit 602.

The distortion of the output of integrated circuit 602 is reduced by adjusting the voltage level presented to pin 606 (TRIM) by trim circuit 411. Trim circuit 411 comprises resistor 627 and 628. The resistor configuration acts as a voltage divider that is coupled with voltage sources 620 ($-V_{EE}$) and 625 ($+V_{CC}$).

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A wireless audio noise reduction system providing wireless communication between an input source and an output device, the wireless audio noise reduction system comprising:
   an encoder comprising:
      a variable compressor, the variable compressor receiving a signal derived from the input source through an input device, the variable compressor invoking compression operation above a first input threshold, the compression operation associated with a compression ratio greater than one to one;
      a modulator connected to the variable compressor; and
      a matching network connected to the modulator, the matching network coupled to a first antenna;
   a decoder communicating with the encoder, the decoder comprising:
      a signal detector, the signal detector's input driven from a second antenna, the second antenna being in wireless communication with the first antenna; and
      a variable expander connected to the signal detector, the variable expander invoking expanding operation above a second input threshold, the expanding operation having an expansion ratio greater than one to one.

2. The wireless audio noise reduction system of claim 1, wherein the modulator and the signal detector utilize frequency modulation (FM) techniques.

3. The wireless audio noise reduction system of claim 1, further comprising:
   a pre-emphasis circuit connected between the variable compressor and the input source.

4. The wireless audio noise reduction system of claim 1, further comprising:
   a high pass filter (HPF) connected between the variable compressor and the input source.

5. The wireless audio noise reduction system of claim 1, wherein the compression ratio is between three to one and eight to one.

6. A wireless audio noise reduction system providing wireless communication between an input source and an output device, the wireless audio noise reduction system comprising:
   an encoder comprising:
      a variable compressor, the variable compressor receiving a signal derived from the input source through an input device, the variable compressor invoking compression operation above a first input threshold, the compression operation associated with a compression ratio greater than one to one, the variable compressor comprising:
- a voltage controlled amplifier (VCA), the VCA's input driven by the input source;
- a root mean square (RMS) detector connected to the VCA; and
- a compression ratio and threshold circuit connected to the RMS detector, the compression ratio and threshold circuit's output affecting the VCA's gain function;

a modulator connected to the variable compressor; and a matching network connected to the modulator, the matching network coupled to a first antenna; and a decoder communicating with the encoder, the decoder comprising:
- a signal detector, the signal detector's input driven from a second antenna, the second antenna being in wireless communication with the first antenna; and
- a variable expander connected to the signal detector, the variable expander invoking expanding operation above a second input threshold, the expanding operation having an expansion ratio greater than one to one.

7. The wireless audio noise reduction system of claim 1, wherein the variable compressor further comprising:
a bias offset circuit, the bias offset circuit reducing a bias difference of the RMS detector and the VCA.

8. The wireless audio noise reduction system of claim 1, wherein the first antenna is integrated with the wireless audio noise reduction system.

9. The wireless audio noise reduction system of claim 1, wherein the input device is integrated with the wireless audio noise reduction system.

10. The wireless audio noise reduction system of claim 1, wherein the input device is selected from the group consisting of a microphone and a recording device.

11. The wireless audio noise reduction system of claim 1, wherein the input device comprises at least one transducer.

12. The wireless audio noise reduction system of claim 1, further comprising:
a de-emphasis circuit connected between the variable compressor and the output device.

13. The wireless audio noise reduction system of claim 1, further comprising:
a low pass filter (LPF) connected between the variable expander and the signal detector.

14. The wireless audio noise reduction system of claim 1, wherein the expansion ratio is between one to three and one to eight.

15. A wireless audio noise reduction system providing wireless communication between an input source and an output device, the wireless audio noise reduction system comprising:
an encoder comprising:
- a variable compressor, the variable compressor receiving a signal derived from the input source through an input device, the variable compressor invoking compression operation above a first input threshold, the compression operation associated with a compression ratio greater than one to one;
- a modulator connected to the variable compressor; and
- a matching network connected to the modulator, the matching network coupled to a first antenna; and a decoder communicating with the encoder, the decoder comprising:
- a signal detector, the signal detector's input driven from a second antenna, the second antenna being in wireless communication with the first antenna; and
- a variable expander connected to the signal detector, the variable expander invoking expanding operation above a second input threshold, the expanding operation having an expansion ratio greater than one to one, the variable expander comprising:
  - a voltage controlled amplifier (VCA), the VCA's input driven by the signal detector;
  - a root mean square (RMS) detector connected to the VCA; and
  - an expansion ratio and threshold circuit connected to the RMS detector, the expansion ratio and threshold circuit's output affecting the VCA's gain characteristics.

16. The wireless audio noise reduction system of claim 15, wherein the variable compressor further comprising:
a bias offset circuit, the bias offset circuit reducing a bias difference of the RMS detector and the VCA.

17. The wireless audio noise reduction system of claim 1, wherein the second antenna is integrated with the wireless audio noise reduction system.

18. An encoder for transmitting on a wireless path from an input source to a decoder, the encoder provided an input signal from the input source, the encoder comprising:
a variable compressor, the variable compressor receiving a signal from the input source through an input device, the variable compressor invoking compression operation above a first input threshold, the compression operation having a compression ratio greater than one to one;
a modulator connected to the variable compressor; and
a matching network connected to the modulator, the matching network coupled to the first antenna.

19. The encoder of claim 18, wherein the modulator utilizes frequency modulation (FM) techniques.

20. The encoder of claim 18, further comprising:
a pre-emphasis circuit connected between the variable compressor and the input source.

21. The encoder of claim 18, further comprising:
a high pass filter (HPF) connected between the variable compressor and the input source.

22. The encoder of claim 18, wherein the compression ratio is between three to one and eight to one.

23. An encoder for transmitting on a wireless path from an input source to a decoder, the encoder provided an input signal from the input source, the encoder comprising:
a variable compressor, the variable compressor receiving a signal from the input source through an input device, the variable compressor invoking compression operation above a first input threshold, the compression operation having a compression ratio greater than one to one, the variable compressor comprising:
- a voltage controlled amplifier (VCA), the VCA's input driven by the input source;
- a root mean square (RMS) detector connected to the VCA; and
- a compression ratio and threshold circuit connected to the RMS detector, the compression ratio and threshold circuit's output affecting the VCA's gain function;

a modulator connected to the variable compressor; and
a matching network connected to the modulator, the matching network coupled to the first antenna.

24. The encoder of claim 23, wherein the variable compressor further comprising:

a bias offset circuit, the bias offset circuit reducing a bias difference of the RMS detector and the VCA.

25. The encoder of claim 18, wherein the first antenna is integrated with the encoder.

26. The encoder of claim 18, wherein the input device is integrated with the encoder.

27. The encoder of claim 18, wherein the input device is selected from the group consisting of a microphone and a recording device.

28. The encoder of claim 18, wherein the input device comprises at least one transducer.

29. A decoder for receiving a signal from an encoder on a wireless path, the decoder provided a received signal from the encoder, the decoder comprising:

a signal detector, the signal detector's input driven by the received signal from a second antenna; and a variable expander connected to the signal detector, the variable expander invoking expanding operation above a second input threshold, the expanding operation having an expansion ratio greater than one to one, the variable expander's output driving an output device.

30. The decoder of claim 29, wherein the signal detector utilizes frequency modulation (FM) techniques.

31. The decoder of claim 29, further comprising:

a de-emphasis circuit connected between the variable compressor and the output device.

32. The decoder of claim 29, further comprising:

a low pass filter (LPF) connected between the variable expander and the signal detector.

33. The decoder of claim 29, wherein the expansion ratio is between one to three and one to eight.

34. The decoder of claim 29, wherein the variable expander comprises:

a voltage controlled amplifier (VCA), the VCA's input driven by the signal detector;

a root mean square (RMS) detector connected to the VCA; and a expansion ratio and threshold circuit connected to the RMS detector, the expansion ratio and threshold circuit's output affecting the VCA's gain characteristics.

35. The decoder of claim 34, wherein the variable expander further comprising:

a bias offset circuit, the bias offset circuit reducing a bias difference of the RMS detector and the VCA.

36. The decoder of claim 29, wherein the second antenna is integrated with the decoder.

37. A non-wireless audio noise reduction system providing communication over a transmission path from an input source and an output device, the non-wireless audio noise reduction system comprising:

an encoder comprising:

a variable compressor, the variable compressor receiving a signal derived from the input source through an input device, the variable compressor invoking compression operation above a first input threshold, the compression operation associated with a compression ratio greater than one to one;

a modulator connected to the variable compressor; and a matching network connected to the modulator, the matching network coupled to the transmission path;

a decoder communicating with the encoder, the decoder comprising:

a signal detector, the signal detector's input driven from the transmission path; and a variable expander connected to the signal detector, the variable expander invoking expanding operation above a second input threshold, the expanding operation having an expansion ratio greater than one to one.

38. A method for encoding an input signal for transmission on a wireless path in order to support noise reduction associated with the wireless path, the method comprising the steps of:

variably compressing the input signal in which compression operation is invoked above an input threshold in order to produce a processed signal;

frequency modulating the processed signal in order to produce a modulated signal;

transmitting the modulated signal through a first antenna.

39. A computer-readable medium having computer-executable instructions for performing the method recited in claim 38.

40. A method for encoding an input signal for transmission on a wireless path in order to support noise reduction associated with the wireless path, the method comprising the steps of:

adjusting a voltage control input of a voltage controlled amplifier (VCA);

measuring a root mean square (RMS) value of a signal that is derived from the VCA's output;

determining a compression ratio and a threshold, the compression ratio and the threshold affecting the VCA's gain function;

frequency modulating the processed signal in order to produce a modulated signal;

transmitting the modulated signal through a first antenna; and transmitting the modulated signal through a first antenna.

41. A computer-readable medium having computer-executable instructions for performing the method recited in claim 40.

42. A method for decoding a received frequency modulated signal that is received on a wireless path to support noise reduction on the wireless path, comprising the steps of:

detecting the received signal, the received signal provided by a second antenna; and variably expanding, in accordance with a signal level, a detected signal as provided by the step of detecting.

43. A computer-readable medium having computer-executable instructions for performing the method recited in claim 42.

44. A method for decoding a received frequency modulated signal that is received on a wireless path to support noise reduction on the wireless path, comprising the steps of:

detecting the received signal, the received signal provided by a second antenna;

adjusting a voltage control input of a voltage controlled amplifier (VCA);

measuring a root mean square (RMS) value of a signal that is derived from the VCA's output; and determining an expansion ratio and a threshold, the expansion ratio and the threshold in order to affect the VCA's gain function.

45. A computer-readable medium having computer-executable instructions for performing the method recited in claim 44.

* * * * *